Patented Apr. 24, 1951

2,550,236

UNITED STATES PATENT OFFICE 2,550,236

DRILLING MUD

Paul W. Fischer, Long Beach, and Raymond A. Rogers, Wilmington, Calif., assignors to Union Oil Company of California, Los Angeles, Calif., a corporation of California No Drawing. Application June 10, 1946, Serial No. 675,840

18 Claims. (Cl. 252—8.5)

This invention relates to the treatment of drilling fluids such as are employed in the drilling of oil and gas wells.

In general a drilling fluid particularly that employed for rotary drilling operations and which is also termed "a drilling mud" or simply "a mud" is a colloidal suspension of clay in water to which other materials such as barium sulfate may be added in order to increase its apparent specific gravity. The physical characteristics of these clay suspensions are largely determined by the properties of the individual clay particles, most important of which are size, shape and surface characteristics.

Until recently it has been considered that the principal functions of a mud in drilling operations are three-fold: it should form a cake on the wall of the hole; it should retain in suspension the cuttings formed so that the latter may be removed from the hole along with the mud; and it should possess sufficient weight to overcome any pressure encountered during drilling. These functions are considered in more detail below.

One of the primary difficulties encountered in the drilling of wells is that due to the sloughing or caving into the hole of the formations penetrated. The use of a drilling mud is supposed to lessen the tendency for caving by "mudding-off" the formations, that is, forming a cake on the walls of the hole. It is recognized, however, that drilling fluids prepared from natural clays vary widely in their ability to prevent sloughing of formations and that those fluids which form a thin gelatinous cake on the walls of the hole and have a minimum tendency to lose water to the surrounding formations are the most desirable.

In order for drilling to proceed smoothly, means must be provided for continuously removing the cuttings from the hole and to this end drilling mud is circulated through the hole. The mud must be of sufficiently low viscosity to allow it to be readily pumped and it should be thixotropic. Thixotropy is that property of colloidal suspension which involves an increase in gel strength as a function of the time of quiescent standing. This property is valuable in that it prevents, to a large extent, the sedimentation of the cuttings in the hole during periods of suspended circulaton. However, immediately after violent agitation, such as is induced by the circulation of the mud, cuttings will settle a short distance and this fact is utilized for their removal in a settling tank provided for the purpose and in which the degree of agitation is suddenly lowered to practically zero. Normally, a mud which has proper wall building characteristics and is pumpable will have adequate thixotropic properties.

Obviously, the total weight of a mud must be sufficiently great to prevent blow-outs from any high pressure formations that may be encountered, but beyond this point, the need for greater weight is problematical. A rapid reduction in the hydrostatic head maintained on formations, caused by a reduction in the specific weight of the mud or by permitting the level of the mud in the well to fall while removing the drilling tools from the hole may cause dangerous caving. Therefore, mud is usually pumped into the well while removing the drill string in order to maintain a substantially constant hydrostatic head on the formations being drilled and the mud gravity is always kept as constant as practical. In general, the practice has been to keep the weight of mud only sufficiently high to prevent blow-outs. It is common practice to increase the specific gravity of a mud by adding insoluble materials of high density, such as for example, barium sulfate, iron oxide, etc. Because of their insolubility, the usual weighting agents employed have little effect on the performance characteristics of a mud.

Of the various characteristics of a drilling mud, the most important is its tendency to lose water to the formation. It has been found that the structural strengths of most formations which are penetrated during drilling are sufficient to prevent the walls of the hole from caving, but that many such formations are weakened from being saturated or even partially saturated with water. Frequently such action causes sloughing of the formation into the hole with a resultant seizing of the drill pipe or tools so that they cannot be removed and costly fishing jobs result. It is, therefore, of the greatest importance to prevent loss of water from the drilling mud to the formations drilled. The ideal drilling fluid should permit very little if any loss of water to the formation and should deposit only a relatively thin mud cake on the walls of the hole.

As has been mentioned hereinabove, the most important physical characteristic of a drilling mud is its ability to form a thin impervious cake on the walls of the hole thereby sealing formations against infiltration of water. The terms cake-forming and water-loss properties, sealing properties and, as will be brought out hereinbelow, filtration characteristics or filter rate are used synonymously throughout this specification to denote this characteristic.

A measure of the tendency for a mud to lose water to the formations being drilled and to form a thin impervious cake upon the wall of the hole can be obtained by means of a simple filtration test. In fact, the sealing properties of the mud are almost entirely dependent upon the character of the mud-cake formed when the latter is pressed against a membrane or filter permeable to water and are very largely independent of the character of the membrane or filter employed. As a consequence, the "filtration rate"

of a mud becomes of prime importance in determining the quality of the mud.

The procedure for determining filtration rate is described in "Recommended Practice on Standard Field Procedure for Testing Drilling Fluids, A. P. I. Code No. 29, Second Edition," published July, 1942, page 11, and consists in measuring the total volume of filtrate water obtained during a given time interval of pressure filtration. The amount of filtrate obtained in the first five minutes of filtration can be used as an indication of the relative quality of various muds. A more accurate evaluation is obtained from the volume of filtrate collected in the first fifteen minutes of filtration. An even better procedure is to determine the total volume of filtrate in the first hour of filtration. Numerous correlations between such tests and actual drilling experience with the same muds have shown that the muds yielding a total filtrate of less than 30 ml. in the first hour's filtration period are usually very satisfactory. On the other hand, muds yielding a total filtrate in excess of 45 ml. under similar circumstances have been found dangerous to use, particularly when drilling through formations which are readily softened by penetration of water, as cave-ins are liable to occur. Under some circumstances, particularly when drilling surface formations, or formations at moderate depth, the permissible maximum filtration rate of the mud may be as high as about 55 ml. of total filtrate in the first hour of filtration. A mud which yields a total filtrate of 30 ml. in the first hour's filtration period will yield about 7 ml. of filtrate in the first five minutes and about 15 ml. of filtrate in the first fifteen minutes of filtration. Similarly a mud which yields a filtrate of 45 ml. in the first hour of filtration will give approximately 11 ml. in the first five minutes and about 22 ml. in the first fifteen minutes of filtration. A mud which is satisfactory for drilling operations will under the conditions of this test, deposit a filter cake of not over one-quarter inch in thickness and of a soft, plastic or gelatinous texture, whereas muds exhibiting unsatisfactory filter rates tend to deposit a thick, tough mud cake. Normally, as has already been mentioned hereinabove, muds possessing acceptable filtering characteristics form good mud cakes and, therefore, in practice only the "filtering rate" is ordinarily observed.

From the foregoing, it may be concluded that in preparing or treating a drilling mud in order to endow it with properties which will tend to insure satisfactory performance in the field, it is desirable that the treated mud when tested, as above described, yield a total filtrate of not over 55 ml. in the first hour of filtration, and preferably less than 30 ml. of filtrate, and that the deposited cake be preferably less than one-quarter inch in thickness and of a soft gelatinous texture.

As has already been mentioned hereinabove, a mud in order to be usable, must be capable of being readily and easily circulated by means of a pump such as is ordinarily employed for the purpose in the field. From a practical standpoint, it has been found that within certain limits the more readily the mud can be circulated, the faster will drilling proceed. On the basis of a large number of experiments, it has been determined that for most operations, the viscosity of the mud should be less than 55 seconds as determined by the Marsh funnel viscosimeter when employing the 500 ml. in and 500 ml. out method. It has been observed that muds having funnel viscosities in excess of 55 seconds give rise to impaired circulation rates and increase the danger of gas cutting. The data obtained with the funnel viscosimeter are empirical and the prior history of the mud will influence greatly the results obtained. For example, in one case it was found that a sample of mud had an indicated funnel viscosity of approximately 45 seconds immediately after being taken from a ditch where it was flowing very slowly whereas a viscosity of 30 seconds was obtained immediately after agitation. Funnel viscosity determinations should, therefore, be made on samples that have been thoroughly agitated or in rapid motion immediately before the tests are started. Throughout this specification and the claims, wherever the terms viscosity, Marsh viscosity, apparent viscosity or funnel viscosity are employed, they relate to the viscosity as determined by means of the above test, a description of which can be found in "Recommended Practice on Standard Field Procedure for Testing Drilling Fluids, A. P. I. Code No. 29, Second Edition," published July, 1942, page 6, except that in Examples I and II 1000 ml. of mud is measured into the funnel and the time determined for the 500 ml. to run out and in Example III 500 ml. of mud is measured into the funnel and the time determined for the 500 ml. to run out.

When the viscosity of a mud is sufficiently low to permit it to be readily circulated and the filtration rate is within the limits described hereinabove, the mud will ordinarily possess sufficient thixotropic properties for all practical purposes.

Hence by regulating the viscosity and the filter performance of a mud within the limits prescribed hereinabove, all of the other performance characteristics of a mud, as they relate to its use in well drilling and particularly oil well drilling, are acceptable.

It is, therefore, one of the objects of this invention to provide for a treatment of a drilling mud which will cause the latter to have a "filtration rate" of less than approximately 45 ml. and at most not more than 55 ml. in the first hour of filtration and a viscosity of less than approximately 55 seconds as determined by the tests described hereinabove, such treatment simultaneously controlling all of the other performance characteristics of the mud to a desirable extent.

The term "performance characteristics" is herein used to include wall building, water-loss and thixotropic properties and viscosity but does not refer to the specific gravity of the mud.

In the usual field operations, it is often necessary to form a cement plug in the hole and to subsequently drill through this plug, thereby contaminating the mud with cement. Mud which has been contaminated with cement is termed "cement-cut mud." It has been observed that such muds usually possess poor performance characteristics in accordance with the quality definitions given hereinabove and that the greater the contamination the poorer the quality. Cement-cut muds often become so viscous in character that it is difficult, and often impossible, to circulate the contaminated material. This increase in apparent viscosity may impart "gas cutting tendencies" to the muds, that is, prevent the escape of gas from the mud, and tend to prevent the proper release of cuttings therefrom. Further, as will be discussed more fully later, such muds form thick, pervious cakes upon the wall of the hole which permit the ready penetration of water into the formation.

Clays, which consist predominately of hydrated silicates of alumina, when suspended in water possess an appreciable electric charge, such charge in general being of a negative character. On the other hand, cement as is well known comprises a complex mixture of compounds of calcium, magnesium, iron, aluminum and silicon. Although it has not been established beyond question and it is not desired to be bound by the theory, it is believed that the poor performance characteristics imparted by the presence of cement to an otherwise satisfactory drilling mud is due in part to the coagulation or flocculation of the negatively charged clay particles by the polyvalent positively charged metallic ions leached from the contaminating cement. Normally by far the largest proportion of the positive ions leached from cement are calcium ions. Muds may also become similarly contaminated during drilling operations by coming in contact with penetrated formations which contain materials, such as gypsum, from which polyvalent metallic ions may be leached by the aqueous phase of the drilling fluid.

Furthermore, depending upon the particular source, even the virgin clays employed for preparing drilling muds may contain materials capable of yielding polyvalent metallic ions when the clay is dispersed in water.

In any event, by whatever means the contamination may take place, it appears that the presence of polyvalent metallic ions either in solution in the aqueous phase and/or in combination with the negatively charged clay particles, is highly undesirable in that such a condition adversely affects the performance characteristics of the mud.

In the past when drilling muds have become contaminated or, in any event, when their apparent viscosities have become undesirably high, it has frequently been the practice to remove the mud from the hole and to dispose of it as useless material. Such practice involved a considerable disposal problem and, furthermore, it entailed considerable expense for the purchase of new mud. It has been the practice in some fields to lower the viscosity of cement-cut muds by the addition of water. This is highly undesirable inasmuch as such muds normally have excessively high filter rates.

Muds reclaimed by means of chemical treatment, unless properly controlled, will not be of high quality nor will they alleviate the difficulties encountered from the caving of formations. The reason for this is that a treatment which merely controls the viscosity of the mud is insufficient unless attention has also been given to the cake-forming and water-loss properties of the mud and their importance.

It has now been found that drilling muds can be treated with certain reagents which will control both the viscosity and the filtration rate of the mud and that it is possible to add the reagents to the mud either after the contamination has taken place or, in those cases where it is known or expected that the mud is going to be contaminated by undesirable materials, such as for example when it is anticipated that a cement plug will be drilled through and that the mud will then become contaminated with cement, the reagents can be added to the mud prior to said contamination. This latter type of treatment immunizes the mud against any substantial deterioration in its performance characteristics upon subsequent admixing with the contaminating material, and in some cases it has been found that such contamination after the addition of the reagents which have now been discovered even improves the performance characteristics of the mud. Illustrative of this point we have observed that when mud becomes contaminated with cement its viscosity and filtration rate become undesirably high, but that these factors can be reduced to desirable values by the addition to the contaminated mud of a mixture of concentrate comprising about 60% sodium sulfonates and 40% lubricating oil and trisodium phosphate. On the other hand, by adding the mixture of concentrate comprising about 60% sodium sulfonate and 40% lubricating oil and trisodium phosphate to the mud prior to contamination with cement, the performance characteristics of the mud are usually improved, and upon the subsequent addition of cement the performance characteristics continue to remain substantially unchanged or may be even further improved.

It is, therefore, an object of this invention to provide a treatment for the conditioning of mud, particularly of contaminated muds, and to so control the treatment that either the viscosity or the filtration rate or both will be improved, the final treated mud to have a viscosity of less than 55 Marsh seconds, and preferably about 20 to 35 Marsh seconds, and a filtration rate of less than 45 ml. and preferably less than 30 ml. per first hour of filtration.

It is another object of this invention to provide for a treatment of mud which will simultaneously control the cake-forming and water-loss properties, the viscosity and the thixotropic properties of the mud and which will not markedly alter the specific gravity of the mud.

It is an additional object of this invention to provide for a "combination treatment" of muds comprising the addition of one or more materials which will control the viscosity of the mud without acceptably altering its cake-forming properties and a second material or combination of materials which will control the cake-forming properties of the mud without acceptably controlling its viscosity, such combination treatment not materially altering the specific gravity of the mud.

It is also an object of this invention to provide for the pretreatment of mud in order to render it immune to the effects of subsequent contamination with cement or similar materials thereby providing for retaining the mud at all times in excellent condition in terms of the desirable properties enumerated hereinabove.

It has been discovered that by a suitable choice of treatment, not only can the viscosity of a mud, and particularly of a contaminated mud, be controlled, but the cake-forming and water-loss properties of the mud, as measured by the filtration rate, can also simultaneously be regulated and maintained at a high quality. It has further been determined that controlling the viscosity of a mud, and especially of a cement-cut mud, does not necessarily control the filtration rate of the mud.

It is desirable in practicing this invention to improve the performance characteristics of a mud not to employ an amount of treating agent or agents in excess of the minimum amount necessary to obtain the desired performance characteristics. If the quantity of reagent exceeds this minimum amount in any great excess the mud may be deleteriously affected. Normally the reagents are added in relatively small proportions in the order of about 0.01% to 2.0% by weight based upon the weight of drilling fluid treated, although under some circumstances as much as 5% by weight or even 10% by weight of some of the reagents may be used. By the application of the above described tests it may readily be determined what the necessary amount of any given reagent or reagents is for any mud.

Before considering the types of reagents comprising the subject matter of this invention, it should first be emphasized that, as might be expected, naturally occurring clays and the muds prepared from them vary considerably in character. For example, they differ in ultimate chemical composition, in amounts and type of colloidal material, and in amounts and types of impurities. Furthermore, the common contaminants which may become included in the mud during its use in drilling operations, namely, calcium hydroxide leached from cement, and gypsum, differ in type, one being a fairly strong base and the other a neutral salt. As a consequence and in view of the complex character of colloidal dispersions, it is only logical to expect that in general the performance characteristics of muds prepared from clays of different origins or even of the same mud contaminated with different materials, will not necessarily be affected in exactly the same manner by the addition of any given treating agent. In spite of these variations it has been found that the treating agents disclosed in the specification when added in proper amount will control the performance characteristics of various muds within acceptable limits.

The methods employed for making performance tests have been outlined in detail above. In determining the effect of a treating agent or agents on a mud, the procedure employed in the laboratory has been to add the desired amount of treating agent or agents to the mud followed by a thorough agitation of the mixture for one hour prior to the conducting of the performance test. It will be observed that such a procedure completely eliminates any necessity for making a chemical analysis of the mud and, as a consequence, it has been found to be the most practical method which can be employed in the field.

It has been discovered that the performance characteristics of a mud and particularly its water loss properties, can be controlled by the addition to the mud of a treating agent selected from the group comprising the alkali metal and ammonium salts of oil-soluble sulfonic acids either singly or in admixture with the alkali metal and ammonium salts of higher molecular weight carboxylic acids or other treating agents described herein.

By the term "alkali metal" salts it is meant to include the salts of lithium, sodium and potassium.

By the term "ammonium" salts it is meant to include not only the salts formed by the reaction of the acids with ammonia but also the salts formed by the reaction of the acids with amines and substituted amines such as dipropyl amine and triethanolamine.

The term "higher molecular weight carboxylic acids" is meant to include those organic compounds of the fatty acid type having more than about 10 carbon atoms per molecule such as, for example, oleic acid, palmitic acid, linoleic acid, etc. It is also meant to include those other carboxylic acids having more than about 10 carbon atoms and closely related to the fatty acids such as, for example, the naphthenic acids and the rosin acids such as abietic acid.

The "sulfonic acids of relatively high molecular weight" employed to prepare the oil-soluble alkali metal and ammonium salts may be those synthetically produced or those obtained from the treatment of petroleum fractions. The latter are formed when lubricating oil fractions or similar petroleum fractions are treated with concentrated or fuming sulfuric acid. The so-called "mahogany acids" dissolve in the oil phase, whereas the so-called "green acids" are the water-soluble organic acids which pass into the sludge. After separation of the sludge the "mahogany acids" which are preferred may be recovered in the form of sodium salts by treatment of the acid-treated oil with sodium hydroxide to produce the sodium sulfonates which are then subsequently removed from the oil solution by extraction with alcohol. The other alkali metal salts and the ammonium salts may be obtained from the above sodium salts by well known processes of metathesis. An example of a commercially available oil-soluble alkali metal salt of a higher molecular weight sulfonic acid is a concentrate in lubricating oil, comprising about 60% sodium sulfonates and 40% lubricating oil.

Desirably, but not necessarily, the treating agent selected from the group comprising the alkali metal and ammonium salts of higher molecular weight carboxylic acids and oil-soluble sulfonic acids, may be dispersed in a petroleum or other hydrocarbon oil such as a spray oil, a transformer oil extract produced by Edeleanu extraction of a suitable petroleum distillate with sulfur dioxide, a light lubricating oil or even a heavy lubricating oil, prior to introduction into the drilling fluid.

It has further been discovered that the alkali metal and ammonium salts of phenols and the alkali metal and ammonium acid and neutral salts of the various acids of phosphorus such as ortho phosphoric acid, pyrophosphoric acid, hexametaphosphoric acid, etc., when added to drilling fluids in conjunction with a treating agent selected from the class of compounds disclosed hereinabove, particularly when the drilling fluid is contaminated with cement or similar materials yielding polyvalent metal ions, results in performance characteristics which are better than can be obtained by the use of either material alone. These are also used in the amounts shown above, such as 0.01% to 2.0% by weight.

One factor which has not been previously mentioned concerning the chemical treatment of muds is based on the fact that in actual commercial use muds may be exposed to temperatures of as high as 150° F. to 250° F., the temperature depending principally upon the location and the depth at which the drilling is being conducted. It has been observed that many muds which have been chemically treated to improve their performance characteristics tend to deteriorate with respect to these characteristics upon prolonged exposure to temperatures in the neighborhood of 200° F. to 250° F., or even lower as is the case in drilling operations. This is apparently due to the fact that the chemicals added may be hydrolyzed or otherwise affected in such a manner as to alter their original effect upon the performance characteristics of the mud. It might be thought, therefore, that the use of chemicals reacting in this way would be a bar to their practical application in the treatment of muds, and in those cases where the degradation with rise in temperature is rapid, such as in the case of sodium hexametaphosphate, their use may be inadvisable. However, it has been found that many chemicals, which apparently only slowly lose their effectiveness upon exposure to heat, may be utilized. In such cases it is preferable to add the chemical to the mud each day, thereby maintaining a low filtration rate and a low viscosity. The addition of three times as much chemical as is required to maintain the desired performance characteristics over a period of one day will not maintain the performance characteristics over a period of three days. Of course, it is evident that wherever it is feasible, it is preferable to use chemicals whose effect upon the performance characteristics of a mud are not altered by prolonged exposure to elevated temperatures such as may be encountered in the particular zone being drilled, and if such chemical will give the desired performance characteristics according to the tests herein disclosed, such a chemical is the most desirable. In some cases, it has been observed that a certain order of addition will give better performance characteristics than the reverse order of addition. In the examples given below, therefore, unless otherwise noted, it will be considered that the chemicals are added in the order in which they are listed, since they give, when added in such order, the most desirable results.

In the practice of this invention in the field, the treating agents may conveniently be added to the circulating mud stream at a point adjacent to the mud pump suction inlet in the mud sump. Thorough admixture of the thus introduced reagents may be assured by rapid recirculation of the mud from the mud sump through a spare slush pump. During treatment mud samples may be taken from the circulating mud stream at frequent intervals and tested in order to determine when the desired degree of treatment has been effected.

Example I

A drilling fluid was prepared by mixing 6.0 pounds of a bentonite clay with 94.0 pounds of water. To samples of this mud various treating agents were added and the viscosity and filtration rate then determined on each sample by the procedures described hereinabove. The data from these several experiments are given in the following tabulation.

| Treating Agent Added, Per Cent by Weight of the Final Drilling Fluid | Marsh Viscosity 1000/500, Secs. | Filtration Rate, ml. | |
| --- | --- | --- | --- |
| | | 1st 5 Min. | 1st 15 Min. |
| (a) No added treating agent | 27 | 4.6 | 9.6 |
| (b) 1.0% concentrate comprising about 60% sodium sulfonates and 40% lubricating oil | 27 | 2.8 | |
| (c) 0.84% concentrate comprising about 60% sodium sulfonates and 40% lubricating oil +0.1% blown filtered tall oil[1]+0.06% triethanolamine | 24 | 2.5 | |
| (d) 0.5% trisodium phosphate | 28 | 4.8 | 9.0 |
| (e) 1.0% concentrate comprising about 60% sodium sulfonates and 40% lubricating oil+0.5% trisodium phosphate | 27 | 3.2 | 6.2 |

[1] Tall oil is an article of commerce obtained as a by-product from the Swedish process for cellulose pulp making. Sweet liquor from the process separates into two layers, the upper of which is the crude tall oil, which may be purified by distillation to yield a product containing both fatty acids and rosin-type acids.

Example II

The same drilling fluid was used as for the experiments described in Example I. To samples of this mud various treating agents were added and subsequently followed by 0.7% by weight of hydrated cement. The viscosities and filtration rates of these samples were determined and are recorded in the following tabulation.

| Treating Agent Added, Per Cent by Weight of the Final Drilling Fluid | Marsh Viscosity 1000/500, Secs. | Filtration Rate, ml. | |
| --- | --- | --- | --- |
| | | 1st 5 Min. | 1st 15 Min. |
| (a) Drilling fluid+0.7% hydrated cement | ([1]) | 6.8 | 13.3 |
| (b) 1.0% concentrate comprising about 60% sodium sulfonates and 40% lubricating oil | ([1]) | 4.2 | 8.2 |
| (c) 0.5% trisodium phosphate | 25.5 | 4.5 | 8.9 |
| (d) 1.0% concentrate comprising about 60% sodium sulfonates and 40% lubricating oil+0.5% trisodium phosphate | 30 | 2.9 | 6.0 |
| (e) 1.0% concentrate comprising about 60% sodium sulfonates and 40% lubricating oil+0.5% sodium phenate | 26 | 3.4 | 7.2 |

[1] Too thick.

Example III

A Santa Maria Valley clay was mixed with water to give a drilling fluid weighing 78.5 pounds per cubic foot. To samples of this mud various treating agents were added and the viscosity and filtration rate then determined on each sample by the procedures already described. The data from these several experiments are given in the following tabulation.

| Treating Agent Added, Per Cent by Weight of the Final Drilling Fluid | Marsh Viscosity 500/500, Secs. | Filtration Rate, ml. | |
| --- | --- | --- | --- |
| | | 1st 5 Min. | 1st 15 Min. |
| (a) No added treating agent | 38 | 12.3 | 22.7 |
| (b) 1.0% concentrate comprising about 60% sodium sulfonates and 40% lubricating oil | 32 | 8.8 | 16.0 |
| (c) 0.05% Tetrasodium pyrophosphate | 26 | 12.4 | 22.8 |
| (d) 0.05% Tetrasodium pyrophosphate+1.0% concentrate comprising about 60% sodium sulfonates and 40% lubricating oil | 26 | 8.3 | 15.0 |
| (e) 5.0% concentrate comprising about 60% sodium sulfonates and 40% lubricating oil+5.0% aromatic light gas oil[1] +40.0% water | 23 | 1.0 | 2.5 |

[1] This oil was 100% soluble in concentrated sulfuric acid, had an A. P. I. gravity of 2.8° and a boiling range of 400-800° F.

Example IV

Example IId was repeated except that the order of addition of the treating agents and the cement were changed, the concentrate comprising about 60% sodium sulfonates and 40% lubricating oil being added to the drilling mud first, then the hydrated cement and finally the trisodium phosphate. Under these conditions the final drilling fluid had essentially the same viscosity and filtration rate characteristics as the mud of Example IId; namely, Marsh viscosity of 29 and a filtration rate for the first 15 minutes of 5.8 ml. This experiment demonstrates that after the mud has been contaminated with cement and has thickened undesirably (as shown in Example IIb), the performance characteristics can still be controlled within desirable limits by subsequent addition of a phosphate.

In many cases we have found that drilling fluids may be materially improved by the use of a mixture of sodium salts of oil and water soluble sulfonic acids. A small quantity of oil is also useful in this composition. For example a drilling fluid comprising water, a suspending agent, such as bentonite or other clay, and about 1% to 5% of a mixture of the sodium salts of oil and water soluble sulfonates exhibited a satisfactory viscosity and improved water loss characteristics. The oil and water soluble sulfonates in the mixture used were present in about equal proportions.

The foregoing examples are presented in the nature of illustrations of the practical value of the processes of the invention and are not to be construed as limiting the invention in any sense.

The drilling fluid described in Example Ia, comprising a mixture of bentonite clay and water, possessed good performance characteristics and would be usable without treatment in the drilling of a well, provided of course that it did not become contaminated with materials such as cement, gypsum, etc. However, as has already been indicated, the lower the filtration rate the more desirable the mud for drilling operations. Examples Ib, Ic, Id, and Ie demonstrate the improvement in performance characteristics, and particularly in filtration rate, which were realized by the addition of treating agents comprising the subject of this invention.

The data for Example IIa show the effect of contaminating the untreated drilling mud of Example I with cement such as might be encountered in the drilling of a cement plug in actual practice. Particularly it will be noted that the viscosity of the mud was increased to such an extent that it would not be pumpable and the filtration rate approached the upper permissible limit as outlined in the specification hereinabove. The addition of 1% of concentrate comprising about 60% sodium sulfonates and 40% lubricating oil alone to the cement-cut mud (Example IIb) improved the filtration rate to a desirable value, but did not sufficiently lower the viscosity to give a usable product. The addition of 0.5% of trisodium phosphate (Example IIc) to the cement-contaminated mud resulted in a product of acceptable performance characteristics. However, even more desirable product resulted from the addition to the cement-contaminated mud of a combination of concentrate comprising about 60% sodium sulfonates and 40% lubricating oil with trisodium phosphate and with sodium phenate (Examples IId and IIe, respectively). The data for Example Id show that trisodium phosphate alone when added to the uncontaminated mud had little or no effect upon the performance characteristics, and similarly the combination of trisodium phosphate and concentrate comprising about 60% sodium sulfonates and 40% lubricating oil added to the uncontaminated mud (Example Ie) gave a product having characteristics similar to that resulting from the addition of concentrate comprising about 60% sodium sulfonates and 40% lubricating oil alone (Example Ib). Accordingly, the drilling mud can be immunized against the effects of cement contamination by the prior addition of a combination of concentrate comprising about 60% sodium sulfonates and 40% lubricating oil and trisodium phosphate and at the same time result in a product having more desirable performance characteristics than the untreated mud alone.

A drilling fluid prepared from a Santa Maria Valley clay and water was found to possess undesirable performance characteristics (Example IIIa). The viscosity and filtration rate of this drilling fluid were improved to acceptable values by the addition of 1% of concentrate comprising about 60% sodium sulfonates and 40% lubricating oil, as shown by the data given in Example IIIb. The addition of a small proportion of tetrasodium pyrophosphate (Example IIIc) improved the viscosity of the drilling fluid to a desirable value but did not appreciably affect the filtration rate. On the other hand, a combination of tetrasodium pyrophosphate and concentrate comprising about 60% sodium sulfonates and 40% lubricating oil when added to the mud (Example IIId) gave a material having better performance characteristics than the products resulting from the addition of either reagent alone. The data for Example IIIe show that an exceptionally high quality drilling fluid was obtained from the Santa Maria Valley clay by the addition of a mixture of concentrate comprising about 60% sodium sulfonates and 40% lubricating oil, an aromatic light hydrocarbon oil and a moderate proportion of water to the suspension of Santa Maria Valley clay in water. The addition of water alone to the Santa Maria Valley clay-water mixture gave a mud of even poorer performance characteristics than that of Example IIIa.

We claim:

1. An aqueous drilling fluid having improved water loss characteristics comprising water, a clay and a treating agent selected from the group consisting of the alkali metal and ammonium salts of oil soluble petroleum sulfonic acids in a minor proportion between about 0.6% and 10% sufficient to reduce the water loss to a value not greater than about 45 ml. in the first hour of filtration.

2. A composition as claimed in claim 1 which contains between about 0.01% and 2.0% of a salt selected from the group consisting of the alkali metal and ammonium, acid and neutral salts of an acid of phosphorus.

3. A composition as claimed in claim 1 which contains between about 0.01% and 2.0% of trisodium phosphate.

4. A composition as claimed in claim 1 which contains between about 0.01% and 2.0% of a salt selected from the group consisting of the alkali metal and ammonium phenates.

5. A composition as claimed in claim 1 which contains between about 0.01% and 2.0% of sodium phenate.

6. A drilling fluid comprising water, a clay, between about 0.6% and 10% of a salt of an oil soluble petroleum sulfonic acid and between about 0.01% and 2.0% by weight of a salt selected from the group consisting of the alkali metal and ammonium, acid and neutral salts of an acid of phosphorus, the amounts being sufficient to reduce the water loss to a value not greater than about 45 ml. in the first hour of filtration.

7. A drilling fluid comprising a water suspension of clay and containing from about 0.6% to 10.0% of the sodium salt of an oil soluble petroleum sulfonic acid and 0.01% to 2.0% of trisodium phosphate, the amounts being sufficient to reduce the water loss to a value not greater than about 45 ml. in the first hour of filtration.

8. A drilling fluid comprising water, a clay, between about 0.01% and 2.0% by weight of trisodium phosphate, between about 0.6% and 10% by weight of the sodium salt of an oil-soluble petroleum sulfonic acid, and between about 0.4% and about 7% by weight of a hydrocarbon oil, the amounts being sufficient to reduce the water loss to a value not greater than about 45 ml. in the first hour of filtration.

9. A drilling fluid comprising water, a clay, about 0.4% to about 7% of a hydrocarbon oil, and about 0.6% to 10% by weight of a treating agent selected from the group consisting of the alkali metal and ammonium salts of oil-soluble petroleum sulfonic acids, the amounts being sufficient to reduce the water loss to a value not greater than about 45 ml. in the first hour of filtration.

10. A drilling fluid comprising water, a clay, about 0.6% of a sodium salt of an oil-soluble petroleum sulfonic acid and about 0.4% to about 7% of a hydrocarbon oil, the amounts being sufficient to reduce the water loss to a value not greater than about 45 ml. in the first hour of filtration.

11. A drilling fluid comprising water, a clay and from 1% to 5% of an equal mixture of sodium salts of oil and water soluble petroleum sulfonic acids, the amounts being sufficient to reduce the water loss to a value not greater than about 45 ml. in the first hour of filtration.

12. A drilling fluid according to claim 6 in which the salt of an acid of phosphorus is tetrasodium pyrophosphate.

13. A drilling fluid comprising water, a clay, between about 0.01% and 10% by weight of a salt of a higher molecular weight carboxylic acid, and between about 0.6% and 10% of a salt of an oil soluble petroleum sulfonic acid, the amounts being sufficient to reduce the water loss to a value not greater than about 45 ml. in the first hour of filtration.

14. A drilling fluid according to claim 13 in which the salt of the carboxylic acid is a triethanolamine salt of tall oil, and the sulfonate salt is sodium mahogany sulfonate.

15. A drilling fluid according to claim 13 in which the carboxylic acid salt is a tall oil salt.

16. A drilling fluid comprising water, clay, about 0.4% to about 7% of a hydrocarbon oil, about 0.01% to 2.0% by weight of a salt selected from the group consisting of the alkali metal and ammonium salts of an acid of phosphorus and between about 0.6% and 10% by weight of a salt of an oil-soluble petroleum sulfonic acid, the amounts being sufficient to reduce the water loss to a value not greater than about 45 ml. in the first hour of filtration.

17. A drilling fluid according to claim 9 in which the hydrocarbon oil is an aromatic oil of approximately gas oil volatility.

18. A drilling fluid according to claim 16 in which the hydrocarbon oil is an aromatic oil of approximately gas oil volatility.

PAUL W. FISCHER.
RAYMOND A. ROGERS.

REFERENCES CITED

The following references are of record in the file of this patent:

UNITED STATES PATENTS

| Number | Name | Date |
|---|---|---|
| 1,819,646 | Loomis et al. | Aug. 18, 1931 |
| 1,999,766 | Lawton et al. | Apr. 30, 1935 |
| 2,209,591 | Barnes | July 30, 1940 |
| 2,286,835 | Robinson et al. | June 16, 1942 |
| 2,331,049 | Schindler | Oct. 5, 1943 |
| 2,342,275 | Hedges et al. | Feb. 22, 1944 |
| 2,369,407 | Robinson | Feb. 13, 1945 |
| 2,380,156 | Dobson et al. | July 10, 1945 |
| 2,430,039 | Anderson | Nov. 4, 1947 |

OTHER REFERENCES

Lawton et al.: Chemical Treatment of Rotary Drilling Fluids, article in Physics, vol. 2, pages 374 and 375, May 1932.

Passler: The Problem of Improving Drilling Muds, Chemical Abstracts, vol. 38, column 473, January 20, 1944.